United States Patent
Yokoyama

(10) Patent No.: US 8,771,117 B2
(45) Date of Patent: *Jul. 8, 2014

(54) CHAIN TRANSMISSION APPARATUS

(75) Inventor: Masanori Yokoyama, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/559,773

(22) Filed: Jul. 27, 2012

(65) Prior Publication Data

US 2013/0053194 A1    Feb. 28, 2013

(30) Foreign Application Priority Data

Aug. 24, 2011  (JP) ................. 2011-182451

(51) Int. Cl.
*F16H 7/06*     (2006.01)
(52) U.S. Cl.
USPC ........................................... 474/91
(58) Field of Classification Search
USPC ........................... 474/230, 91, 140
See application file for complete search history.

(56) References Cited

U.S. PATENT DOCUMENTS

| | | | | | |
|---|---|---|---|---|---|
| 2,568,649 | A | * | 9/1951 | McIntosh et al. | 474/231 |
| 3,074,290 | A | * | 1/1963 | Eastep | 474/231 |
| 4,036,072 | A | * | 7/1977 | McKeon et al. | 474/226 |
| 4,117,738 | A | * | 10/1978 | McKeon | 474/228 |
| 5,192,252 | A | * | 3/1993 | Skurka et al. | 474/210 |
| 5,382,199 | A | * | 1/1995 | Ducharme | 474/210 |
| 5,562,558 | A | * | 10/1996 | Kubota | 474/209 |
| 7,108,622 | B2 | * | 9/2006 | Okabe | 474/156 |
| 7,419,449 | B2 | * | 9/2008 | Tohara et al. | 474/213 |
| 8,469,845 | B2 | * | 6/2013 | Miyazawa et al. | 474/206 |
| 2007/0082776 | A1 | * | 4/2007 | Nagao | 474/230 |
| 2007/0111833 | A1 | * | 5/2007 | Young | 474/152 |
| 2007/0254759 | A1 | * | 11/2007 | Tamiya | 474/230 |
| 2008/0020882 | A1 | * | 1/2008 | Tohara et al. | 474/212 |
| 2010/0093475 | A1 | * | 4/2010 | Miyazawa | 474/231 |
| 2012/0316020 | A1 | | 12/2012 | Miyazawa | |
| 2013/0053194 | A1 | * | 2/2013 | Yokoyama | 474/91 |

FOREIGN PATENT DOCUMENTS

| | | |
|---|---|---|
| JP | 05164196 | 6/1993 |
| JP | 7-71539 | 3/1995 |
| JP | 2001124149 | 5/2001 |
| JP | 2010-261353 | 12/2010 |

* cited by examiner

*Primary Examiner* — William A Rivera
*Assistant Examiner* — Michael Riegelman
(74) *Attorney, Agent, or Firm* — Howson & Howson LLP

(57) ABSTRACT

In a power transmission utilizing a bushingless roller chain, the inner links of the chain have chain guide-contacting backs that have a convex arcuate shape, and the outer links are shaped so that they do not contact the chain guides. The rollers are wider than the sprocket teeth that they engage, and widthwise gaps between the ends of the rollers and the outer link plates allow the inner link plates to move in the widthwise direction. The gap between the inner surfaces of the rollers and the outer surfaces of the connecting pins of the chain is larger than the gap between the inner surfaces of the holes in the inner link plates and the outer surfaces of the connecting pins that extend through them.

3 Claims, 5 Drawing Sheets

CHAIN TRANSMISSION APPARATUS

This application claims priority on the basis of Japanese Patent Application No. 2011-182451, filed on Aug. 24, 2011, the disclosure of which is hereby incorporated by reference.

FIELD OF THE INVENTION

This invention relates to a chain transmission having a bushingless roller chain including rollers directly supported by connecting pins which connect outer and inner link plates. The chain transmission apparatus has utility in automobiles, industrial machinery, conveyors and other machinery.

BACKGROUND OF THE INVENTION

In known chain transmissions including a bushingless roller chain engaged with sprockets, the chain is composed of outer and inner link plates, connecting pins and rollers. Pairs of inner link plates and pairs of outer link plates are disposed in an alternating, overlapping arrangement along the direction of travel of the chain. The pins are fixed to the outer link plates and extend through pin holes in the inner link plates and through the rollers in such a way that the inner link plates can articulate relative to the outer link plates and the rollers can rotate on the pins. Teeth on the sprockets engage with the rollers. A chain transmission using a bushingless roller chain is described Japanese patent application 1991-0349922, laid open under no. Hei 5-164196 on Jun. 29, 1993. A similar bushingless roller chain, having sets of multiple link plates in widthwise rows, is described in Japanese patent Application No. 1999-0310336, laid-open under No. 2001-124149 on May 8, 2001.

Unlike conventional roller chains, these roller chains have no bushings fixed to inner link plates and interposed between rollers and connecting pins. The rollers therefore contact the connecting pins directly. A large impact force acts on the rollers, the connecting pins, and the inner link plates when the rollers start to engage a sprocket tooth, reducing the durability of the rollers, the connecting pins and the inner link plates and generating excessive noise.

If the chain transmission incorporating a bushingless roller chain includes chain guides, an additional problem arises. If the outer and inner link plates of the chain conform to the surface of the chain guide the contact area between the chain and the guide becomes large, and results in a high frictional loss and decreased power transmission efficiency.

Accordingly, there is a need for a chain transmission utilizing a bushingless roller chain, in which the inner link plates, connecting pins and rollers have improved durability, in which power transmission efficiency is improved, and in which noise generated as the rollers engage sprocket teeth is reduced.

SUMMARY OF THE INVENTION

The chain transmission according to the invention comprises a bushingless chain, a plurality of sprockets, and a pair of chain guides. The chain, which is in the form of an endless loop, comprises pairs of outer link plates, pairs of inner link plates disposed between the pairs of outer link plates, connecting pins, and rollers. The sprockets have sprocket teeth that engage with the rollers of the chain so that the chain travels along a direction of travel around the sprockets. The guides include a movable guide operated by a tensioner, and a stationary guide. Both guides have sliding contact surfaces on which the chain slides as the chain travels around the sprockets. The pairs of inner link plates and the pairs of outer link plates are arranged in alternating sequence, and linked together articulably by the connecting pins. The connecting pins are fixed to the outer link plates and extend through holes in the inner link plates, which are directly supported by, and rotatable on, the connecting pins. The chain is lubricated by oil from an oil supply. One of the rollers is rotatable on each connecting pin and a film of said oil is disposed between the outer circumferential surface of each connecting pin and the inner circumferential surface of the roller thereon.

The link plates have back surfaces which face toward the outside of said endless loop, and only the inner link plates come into contact with the sliding-contact surfaces of the guides, by contact between parts of the back surfaces of the inner link plates and the sliding contact surfaces of the guides. The parts of the back surfaces of the inner link plates that come into contact with the sliding contact surfaces of the guides are in the form of convex arcs having axes transverse to the direction of travel of the chain.

In the chain transmission an oil film is produced between the outer circumferential surfaces of each connecting pin and the inner circumferential surface of the surrounding roller, and only the inner link plates, the backs of which are in the form of convex arcs, come into sliding contact with the guides. Therefore, the contact area between chain and the guide is reduced, frictional loss is reduced, and power transmission efficiency of the chain transmission is improved.

Oscillation of the inner link plates resulting from friction between the link plates and the guide surfaces is absorbed by radial gaps between the connecting pins and the holes in the inner link plates through which the connecting pins extend. Therefore, whereas there oscillation of link plates causes oscillation in the thickness of the oil film between the bushings and the rollers in a roller chain having bushings fixed to the inner link plates, it is possible to suppress this oscillation in the thickness of the oil film in the chain according to the invention. Consequently, it is possible to stabilize the impact-reducing effect of the oil film, i.e., to reduce the impact applied by the sprocket teeth to the rollers and the connecting pins, when the rollers start to engage the sprocket teeth, to reduce noise, and to achieve improvements in the durability of the rollers and the connecting pins, and in the overall durability of the chain.

Because the inner link plates oscillate, the contact regions between the inner link plates and the guides, and between the connecting pins and the holes in the inner link plates, are less concentrated.

The durability of the inner link plates and the overall durability of the chain can be further improved by making the thickness of the inner link plates larger than the thickness of the outer link plates, so that wear is still further suppressed.

In another aspect of the invention, the width of the rollers is greater than the maximum width of the sprocket teeth, and widthwise gaps are formed between the ends of the rollers and the outer link plates. These gaps being sufficiently large to allow movement of the inner link plates in the direction of the width of the chain. By allowing widthwise movement of the inner link plates, it is possible to reduce the impact caused by the collision of the inner link plates and the sprocket teeth, and to reduce the noise and wear caused by the collisions.

In still another aspect of the invention, the inner diameter of the rollers is larger than the inner diameter of said holes in the inner link plates. The smaller radial gap between the inner link plate and the connecting pin suppresses flow of oil held between a roller and an inner link plate through the radial gap. Therefore, the formation of the oil film between the roller and the connecting pin, and the increase of its thickness, are accelerated, and the effect the oil film in reducing the impact on the roller and the connecting pin when the roller starts to engage with the sprocket tooth is enhanced. Accordingly, it is possible to reduce the noise generated when the roller starts to engage with the sprocket tooth and to improve the durability of the roller and the connecting pin.

Further features of the invention will become apparent from the following description of exemplary embodiments with reference to the attached drawings.

DETAILED DESCRIPTION OF THE PREFERRED EMBODIMENT

Figure 1:
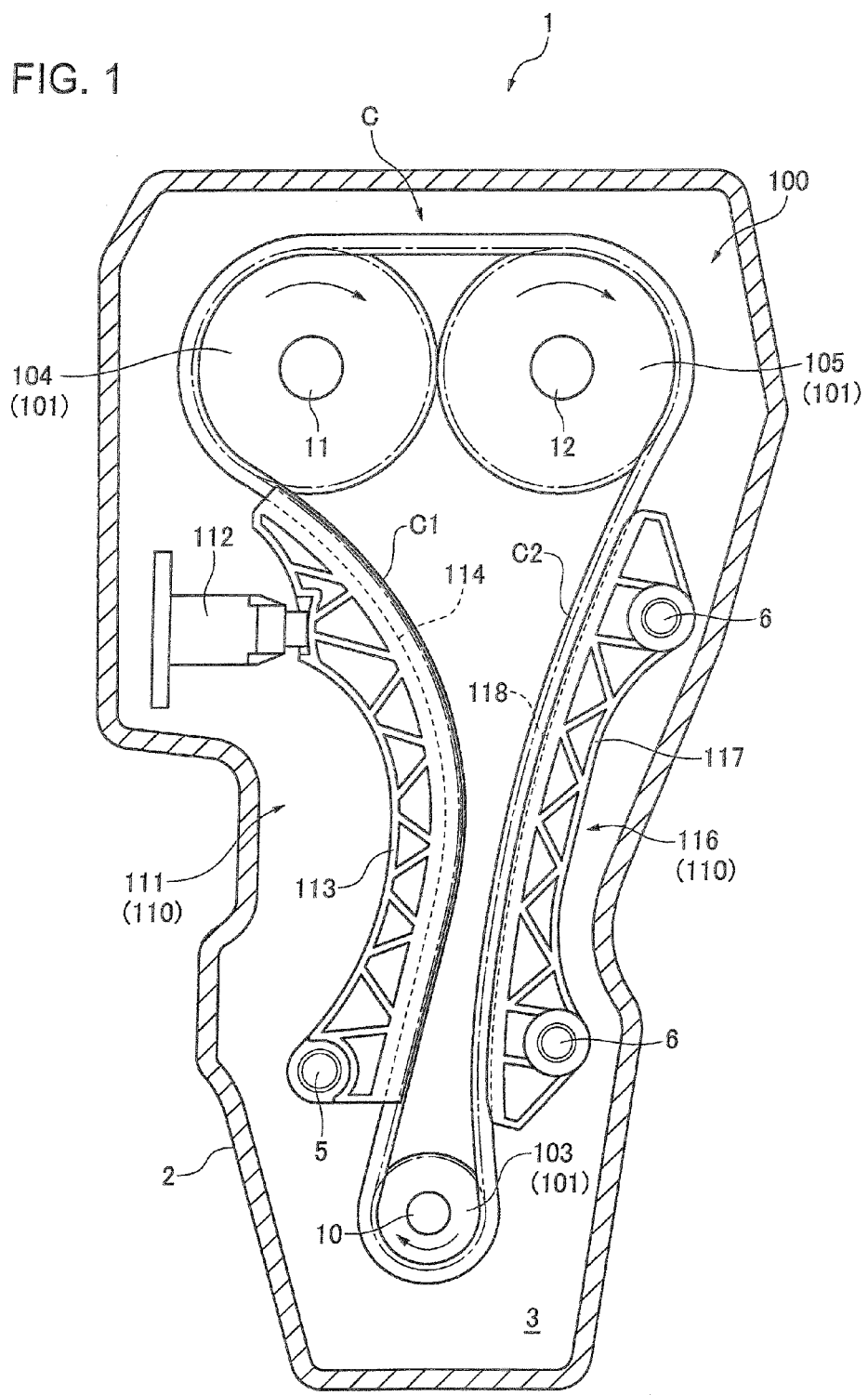
FIG. 1 is a schematic front elevational view of an engine timing drive incorporating a chain transmission according to the invention.
Figure 2:
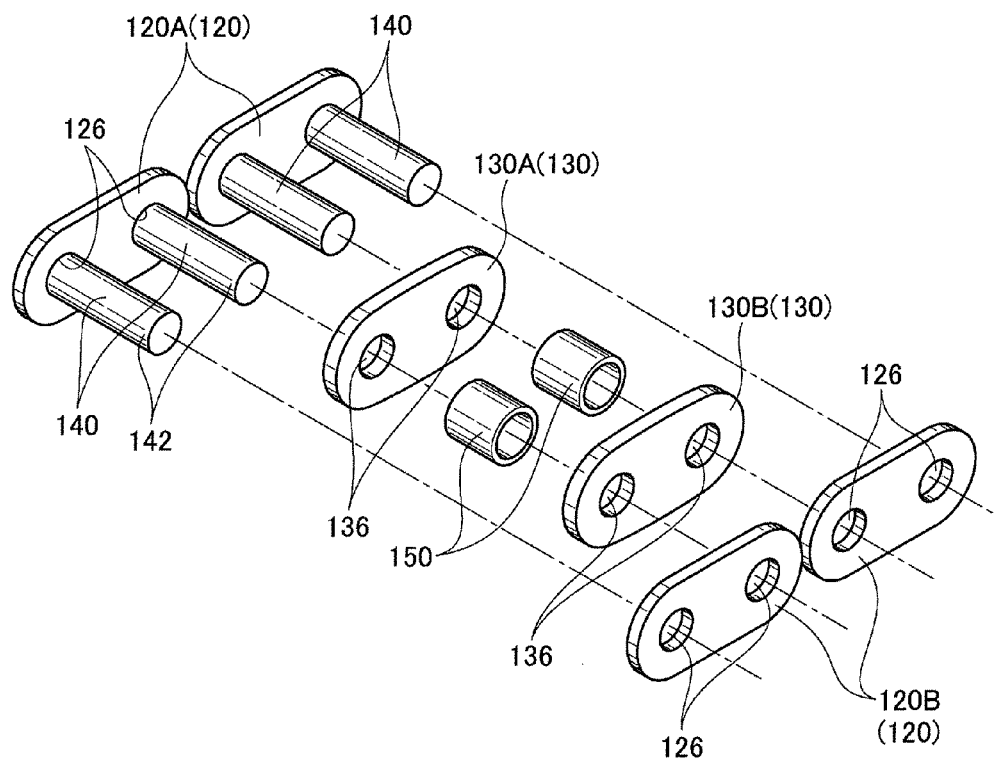
FIG. 2 is an exploded perspective view of a part of a bushingless roller chain according to the invention.
Figure 3:
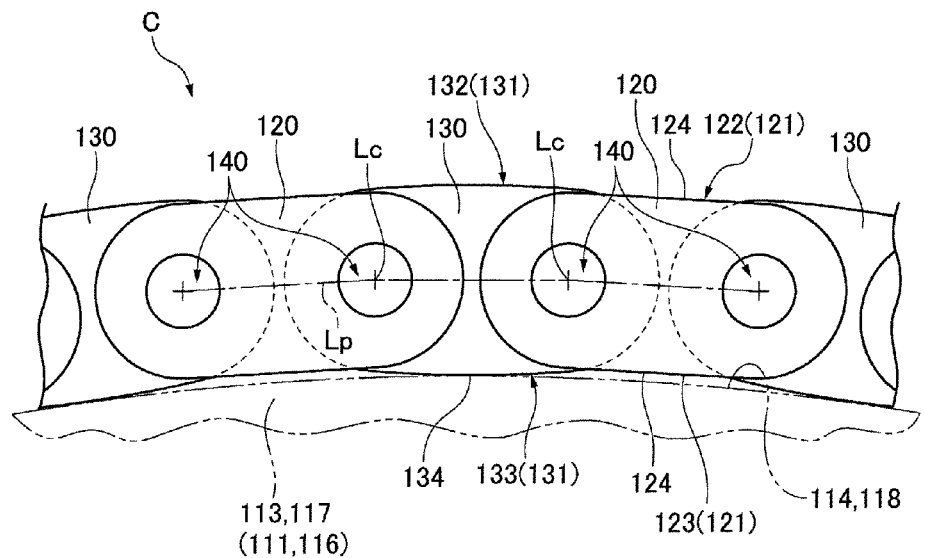
FIG. 3 is a fragmentary side elevational view showing a part of the chain in sliding contact with a chain guide.
Figure 4:
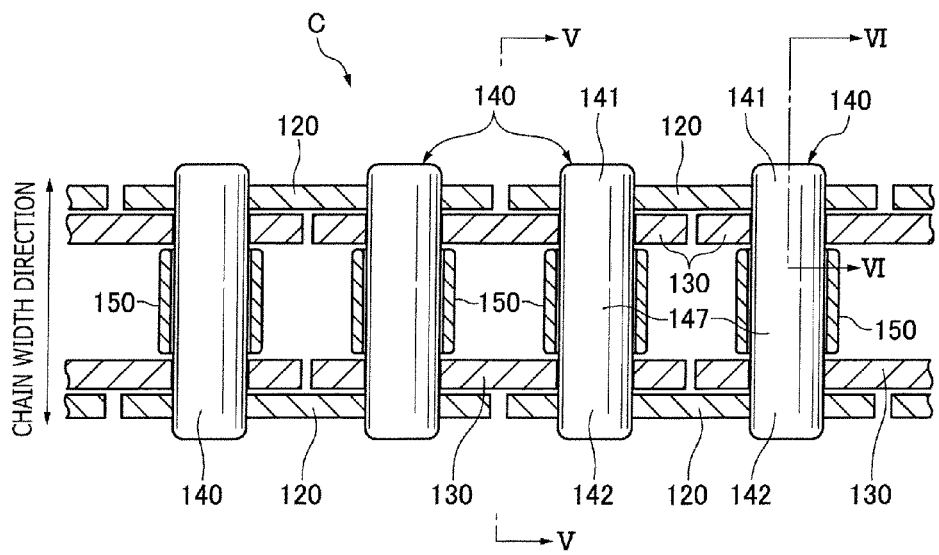
FIG. 4 is a sectional view of the part of the chain shown in FIG. 3, taken on a surface defined by the connecting pin axes.

As shown in FIG. 1, the timing drive 100 of an engine 1 is located inside a timing drive cover 2 and includes a bushingless roller chain C having, as shown in FIGS. 2-4, a plurality of rollers 150 respectively rotatable on, and directly supported by, a connecting pins 140. Each of sprockets 101 has a plurality of sprocket teeth 102 (FIG. 5) which engage with the rollers 150. The chain C is an endless chain in the form of a loop and is in sliding engagement with two chain guides 110.

The sprockets include a driving sprocket 103 on and driven by a crankshaft 10, and a pair of driven sprockets 104 and 105 on valve-operating camshafts 11 and 12, respectively.

The chain guides 110 include a movable chain guide 111, on the slack side C1 of the chain C that travels from sprocket 103 toward sprocket 104, and a stationary chain guide 116, on the tension side C2 of the chain that travels from sprocket 105 toward sprocket 103.

A chain tensioner assembly 111 includes a tensioner 112 that exerts a biasing force for applying tension to the traveling chain C, and a guide lever 113, pivoted on pin 5 and biased by the tensioner 112 so that it presses against the chain.

The stationary chain guide 116 comprises stationary guide member 117, supported in fixed relation to the engine by a pair of supports 6 provided on the engine block.

The guide lever 113 and the stationary guide member 117 have surfaces 114 and 118 respectively, in sliding contact with the chain C.

The chain transmission 100 is disposed within an enclosed, oil-tight space 3 formed by the engine block and the timing chain cover 2. The chain C, the sprocket teeth, the sliding contact surfaces of the guides, and other engine components within the space 3 are lubricated by oil supplied from the engine oil pump (not shown). One or more oil jets (not shown) can be used to direct oil to the regions that contact each other movably, e.g., the regions in which the rollers contact the teeth of the sprockets and the regions in which the chain comes into sliding contact with the guides.

As shown in FIGS. 2 through 4, the chain C includes a plurality of sets of outer link plates 120 that face each other in pairs while being spaced from each other in the direction of the width of the chain. The chain also includes sets inner link plates 130 that face each other in pairs, the plates of each pair also being spaced from each other in the direction of the width of the chain. The pairs of inner link plates 130 are arranged in alternating relationship with the pairs of outer link plates 120, and connecting pins 140, press-fit into pin holes 126 in the outer link plates extend rotatably through holes 136 in the inner link plates, thereby holding the element so the chain together while allowing articulation of the chain. Each of the pins 140 extends through a roller 150 disposed between a pair of inner link plates 130.

The traveling direction of the chain is the direction in which the chain C moves as it engages with sprockets 103-105 in FIG. 1, and the chain width direction is the direction parallel with the axes Lc of the connecting pins 140 about which the chain bends as the inner link plates 130 articulate with respect to the outer plates 120 as shown in FIG. 3. The chain width direction is also parallel to the axes of rotation of the sprockets 103-105. Radial and circumferential directions are directions defined with reference to axes Lc of the connecting pins 140.

Each of the outer link plates 120 has an outer circumferential surface 121 symmetrical about a reference line Lp extending perpendicularly through pin axes Lc. Circumferential surface 121 includes an inner surface 122 facing toward the inside of the loop formed by the chain and an opposite back surface 123 facing toward the outside of the loop. The chain height direction is a direction orthogonal to the reference line Lp when seen from the side.

As shown in FIG. 3, the back surface 123 faces toward the sliding contact surfaces 114 and 118 of the chain guides. The inner surface 122 is located on the side opposite from the back surface 123, i.e., on the side facing the sprockets. The inner surface 122 and the back surface 123 have straight flat portions 124 parallel to the reference line Lp.

Each outer link plate 120 is provided with a pair of pin holes 126 separated from each other along the direction of chain travel. As shown in FIG. 4, opposite end portions 141 and 142 of each connecting pin 140 are press-fit to the pin holes 126 in the outer link plates, and fill the pin holes in such a way as to prevent oil from flowing though the pin holes. As an alternative to press-fitting, the connecting pins can be welded or otherwise fixed to the outer link plates.

Each inner link plate 130 has an outer circumferential surface 131 symmetrical about a reference line Lp. The outer circumferential surface includes an inner surface 132 facing the sprockets and an opposite back surface 133 that faces the guides.

Each inner link plate 130 is provided with a pair of circular through holes 136 separated from each other along the direction of chain travel. Connecting pins 140 fit loosely through these holes. The connecting pins 140 support the inner link plates 130 directly, and the inner link plates are rotatable relative to the outer plates 120 about axes Lc.

Figure 6:
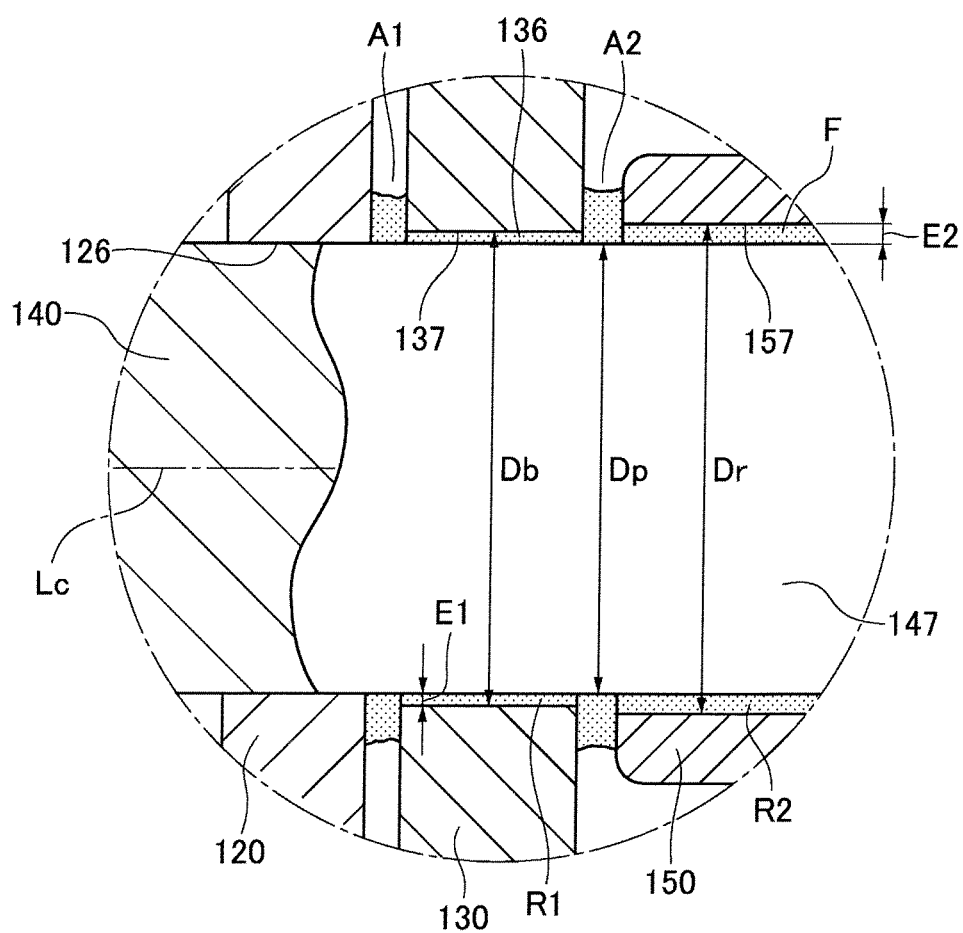
FIG. 6 is an enlarged sectional view taken on section plane VI-VI in FIG. 4.

As shown in FIG. 6, a radial gap R1 is formed between the outer circumferential surface of each pin and the inner surface 137 of the through hole 136.

Figure 5:
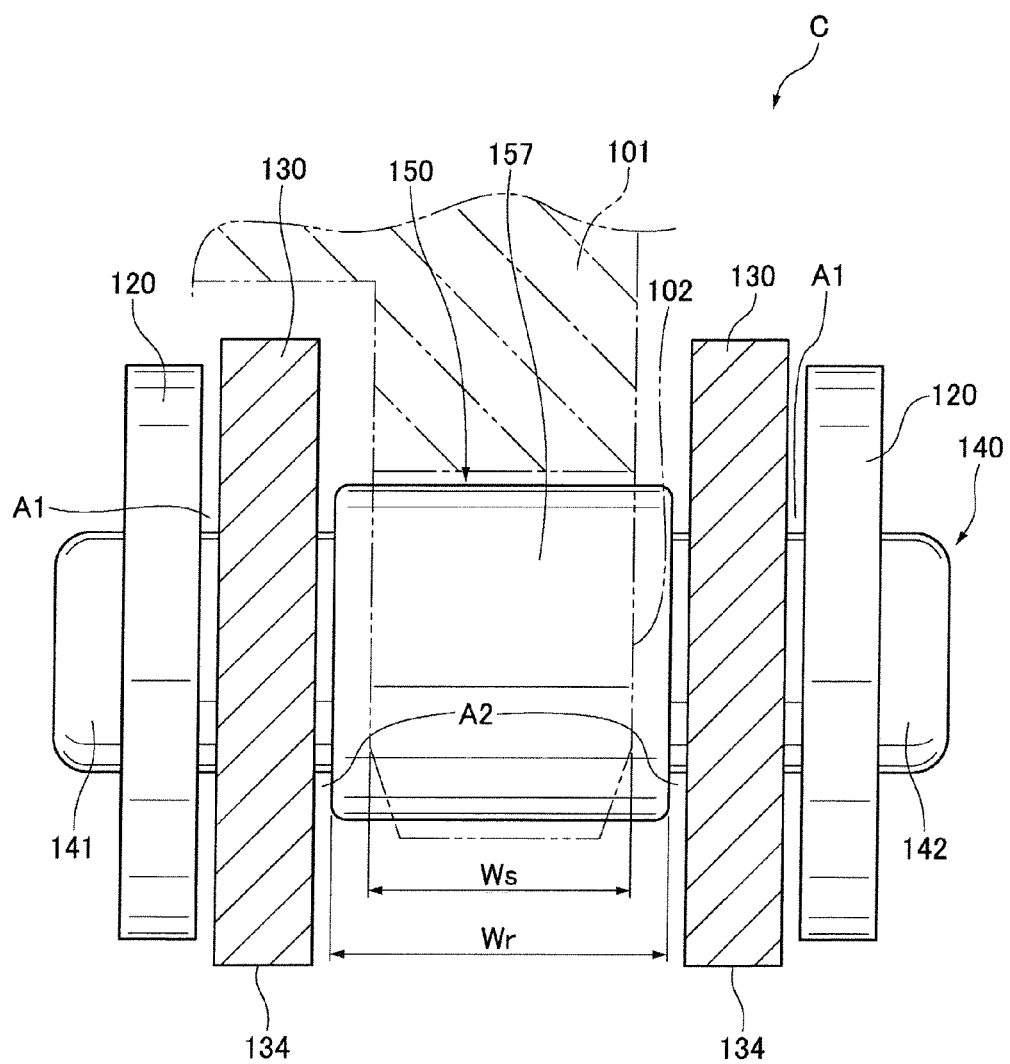
FIG. 5 is a sectional view taken on a section plane V-V in FIG. 4, illustrating engagement of the chain with a sprocket.

The thickness of the inner link plates 130 is preferably larger than the thickness of the outer link plate 120, as shown in FIGS. 4 and 5.

As shown in FIGS. 3 and 5, the height of the inner link plate 130 is greater than the height of the outer plate 120 so that the back surface 133 and the inner surface 132 of the inner link plate 130 project in the chain height direction beyond the back surface 123 and the inner surface 122 of the outer plate 120 respectively when the pairs of the outer link plates 120 and the pair of inner link plates 130 are connected by the connecting pins 140. Therefore, only the inner link plates 130 of the chain C, contact the sliding contact surfaces 114 and 118 of the chain guides. The back surface 133 of each inner link plate 130 has a single contact portion 134 that comes into sliding contact with surfaces 114 and 118 of the guides. This contact portion 134 is only a part of the back surface 133, and is in the form of a convex arc having an axis perpendicular to the direction of chain travel and parallel to the axes of the connecting pins. The arc is generally circular in shape but can be a composite arc having a varying radius of curvature.

As shown in FIG. 4, each of the connecting pins 140 has a constant outer diameter at least within the range in which the roller 150 and the pair of inner link plates 130 are movable by in the chain width direction.

In the assembly of the chain, as shown in FIG. 2, end portions 141 (FIG. 4) of a pair of connecting pins 140 are press-fit into the pair of pin holes 126 of an outer link plate 120A. Each connecting pin 140 is then inserted sequentially through an inner link plate 130A, a roller 150, and another inner link plate 130. End portions 142 (FIG. 4) of the respective connecting pins 140 are press-fit into pin holes 126 of an outer link plate 120B which is opposite to and paired with outer link plate 120A. The chain C can be assembled efficiently from one side in the chain width direction.

As shown in FIGS. 5 and 6, widthwise gaps A1 exist between the outer link plates 120 and the inner link plates 130 and widthwise gaps A2 are produced between the inner link plates 120 and the roller 150. These gaps allow the inner link plates 130 and the roller 150 to move in the chain width direction even though the outer link plates 120 are connected to inner link plates 130 by a connecting pin 140. Both gaps A1 and A2 are between the outer link plates 120 and the roller 150.

As shown in FIG. 5, the roller 150 has a roller width Wr which is larger than the maximum width Ws of a sprocket tooth 102.

As shown in FIG. 6, the inner diameter Dr of the roller 150, defined by an inner circumferential surface 157, is larger than the diameter Db of the through hole 136 of the inner link plate 130. The inner diameter Dr and the hole diameter Db are both larger than the outer diameter Dp of the connecting pin 140 defined by its outer circumferential surface 147. Moreover, diameter Dr is larger than diameter Db. Therefore the width E2 of the radial gap R2 between the inner circumferential surface 157 of the roller 150 and the outer circumferential surface 147 of the connecting pin 140 is greater than the width E1 of the radial gap R1 between the outer circumferential surface 147 of the connecting pin and the inner circumferential surface 137 of the through hole in the inner link plate. The radial widths E1 and E2 are the radial widths of the gaps R1 and R2 when the roller 150, the through hole 136 and the connecting pin 140 are coaxial.

An oil film F is formed by oil supplied from an oil supply to the chain transmission chamber 3 (FIG. 1) in the radial gap R2 between the outer circumferential surface 147 of the connecting pin 140 and the inner circumferential surface 157 of the roller 150.

As a result of variation of the frictional force between the contact portion 134 and the sliding contact surfaces 114 and 118 as an inner link plate comes into contact with and departs from the sliding contact surface, and as a result of variations in chain tension, the inner link plate 130 oscillates within a range restricted by the connecting pins. As the inner link plate oscillates, the radial gap R1 of the inner link plate 130 oscillates around a connecting pin 140.

When the link radial gap R1 is reduced, part of the oil held in the gap is pushed outward in the chain width direction and enters the radial gap R2, thus increasing the amount of oil forming the oil film F.

Because of the convex shape of the back surface 133 of the inner link plate, the contact area between the back surface 133 of the inner link plate 130 and the sliding-contact surfaces 114 and 118 of the chain guide 110 is reduced. Moreover, the outer plate 120 does not contact the sliding-contact surfaces 114 and 118 at all. Accordingly, frictional loss is reduced, and the power transmission efficiency of the chain transmission can be improved.

The oscillation of the inner link plate 130 that would otherwise be transmitted to the connecting pin 140 is absorbed by the radial gap R1 between the connecting pin 140 and the through hole 136 because the connecting pin 140 is loosely fitted through the through hole 136. Therefore, compared to the oscillation of a thickness of an oil film between a bushing and a roller in a roller chain having bushings fixed to its inner link plates, it is possible to achieve a greater suppression of the oscillation of the thickness of the oil film F between the connecting pin 140 and the roller 150. Moreover, it is possible to stabilize the impact reducing effect brought about by the oil film F, i.e., the impact applied by the sprocket teeth to the rollers and the connecting pins when the rollers starts to engage with the sprocket teeth. As a result, it is possible to reduce the noise otherwise caused by the impact of the sprocket teeth and the rollers, and to improve the durability of the rollers and the connecting pins, and the overall durability of the chain.

Because the inner link plate 130 oscillates when the contact portion 134 slides on sliding contact surfaces 114 and 118, the region where the contact portion 134 contacts surfaces 114 and 118, and the region where the connecting pin 140 contacts the inner surface 137 of the through hole 136, are dispersed. Therefore, it is possible to suppress the wear of surface 137 which would occur if the contact regions were concentrated.

Where the thickness of the inner link plate 130 is larger than the thickness of the outer plate 120 wear is suppressed still further, and it is possible to realizes further improvements in the durability of the inner link plates 130 and the connecting pins 140, and to improve the overall durability of the chain.

The roller width Wr is larger the maximum tooth width Ws of the sprocket tooth 102 and widthwise gaps in which the inner link plates 130 are movable in the chain width direction are produced between the outer link plates 120 and the roller 150. Because the roller width Wr is larger than the maximum tooth width Ws, it is possible to suppress collision between the sprocket tooth 102 and inner link plates 130, and to suppress wear of the inner link plates 130.

Because widthwise gaps A1 and A2, in which the inner link plates 130 are movable in the chain width direction, are produced between the outer link plates 120 and the roller 150, it is possible to alleviate the impact caused by the collision of the inner link plate 130 and a sprocket tooth 102, and to reduce the noise and wear caused by the collision.

Because the inner diameter Dr of the roller 150 is larger than the diameter Db of the through hole 136, while the outer circumferential surface 147 of the connecting pin 140 has a uniform outer diameter Dp, flow of oil held between the roller 150 and the inner link plate 130 to the outer plate 120 through gap R1 is suppressed. On the other hand, oil can more readily flow into the radial gap R2 between the connecting pin 140 and the roller 150. Therefore, the formation of the oil film F and the increase of its thickness are accelerated. It then becomes possible to enhance the effect the oil film F in reducing the impact acting on the rollers 150 and the connecting pins 140 when a roller 150 begins to engage a sprocket tooth 102. Accordingly, it is possible to reduce the noise generated when a roller 150 starts to engage the sprocket tooth 102 and to improve the durability of the rollers and the connecting pins.

In addition, because the hole in the outer link plate to which the connecting pin 140 is secured is oil-tight, oil is prevented from flowing to the outside of the outer link plate along the connecting pin. As a result, oil held between the roller 150 and the inner link plates 130 can be utilized for forming the oil film F more efficiently.

In a modified configuration of the chain, the back surface 133 of the inner link plate 130 may have other configurations that contact sliding contact surfaces 114 and 118 of the guides in a manner similarly to the manner in which contact portion 134 contacts the guide surfaces. Moreover, the outer circumferential surfaces 121 and 131 of the respective link plates need not be symmetrical about the reference lines Lp.

The chain transmission apparatus of the invention can be utilized not only in automobile engines but as a power transmission apparatus in industrial machinery, conveyors and various other kinds of machinery.

What is claimed is:

1. A chain transmission comprising:
   a bushingless chain comprising pairs of outer link plates, pairs of inner link plates disposed between the pairs of outer link plates, connecting pins, and rollers, said chain being in the form of an endless loop;
   a plurality of sprockets having sprocket teeth that engage with the rollers of the chain whereby the chain travels along a direction of travel around the sprockets; and
   a tensioner, a movable guide operated by the tensioner, and a stationary guide, both guides having sliding contact surfaces on which the chain slides as the chain travels around said sprockets;
   wherein the pairs of inner link plates and the pairs of outer link plates are arranged in alternating sequence and linked together articulably by said connecting pins;
   wherein the connecting pins are fixed to the outer link plates and extend through holes in the inner link plates;
   wherein the inner link plates are directly supported by, and rotatable on, the connecting pins, and an inner link plate radial gap is formed between each said connecting pin and the inner surface of each hole in the inner link plate through which the connecting pin extends;
   wherein the chain is lubricated by oil from a oil supply;
   wherein oil from said oil supply is disposed in each said inner link plate radial gap;
   wherein one of said rollers is rotatable on each connecting pin and a film of said oil is disposed in a roller radial gap between the outer circumferential surface of each connecting pin and the inner circumferential surface of the roller thereon;
   wherein the link plates have back surfaces which face toward the outside of said endless loop and only the inner link plates come into contact with the sliding-contact surfaces of the guides, by contact between contact portions of the back surfaces of said inner link plates and the sliding contact surfaces of the guides, each of said inner link plates having only one contact portion, and each of said contact portions being continuous and having a length extending in a plane parallel to a plane in which said direction of travel of the chain lies; and
   wherein the entire length of each of said contact portions of the back surfaces of the inner link plates that come into contact with the sliding contact surfaces of the guides is in the form of a convex arc having an axis transverse to the direction of travel of the chain whereby said inner link plates are caused to oscillate upon engagement with an disengagement from the sliding contact surfaces of said guides;
   whereby, by oscillation of said inner link plates, oil from said inner link plate radial gap is pushed in the direction of the width of the chain and enters the roller radial gap.

2. The chain transmission according to claim 1, wherein the width of the rollers is greater than the maximum width of the sprocket teeth, and wherein widthwise gaps are formed between the ends of the rollers and the outer link plates, said gaps being sufficiently large to allow movement of the inner link plates in the direction of the width of the chain.

3. The chain transmission apparatus according to claim 1, wherein the inner diameter of the rollers is larger than the inner diameter of said holes in the inner link plates.

* * * * *